UNITED STATES PATENT OFFICE.

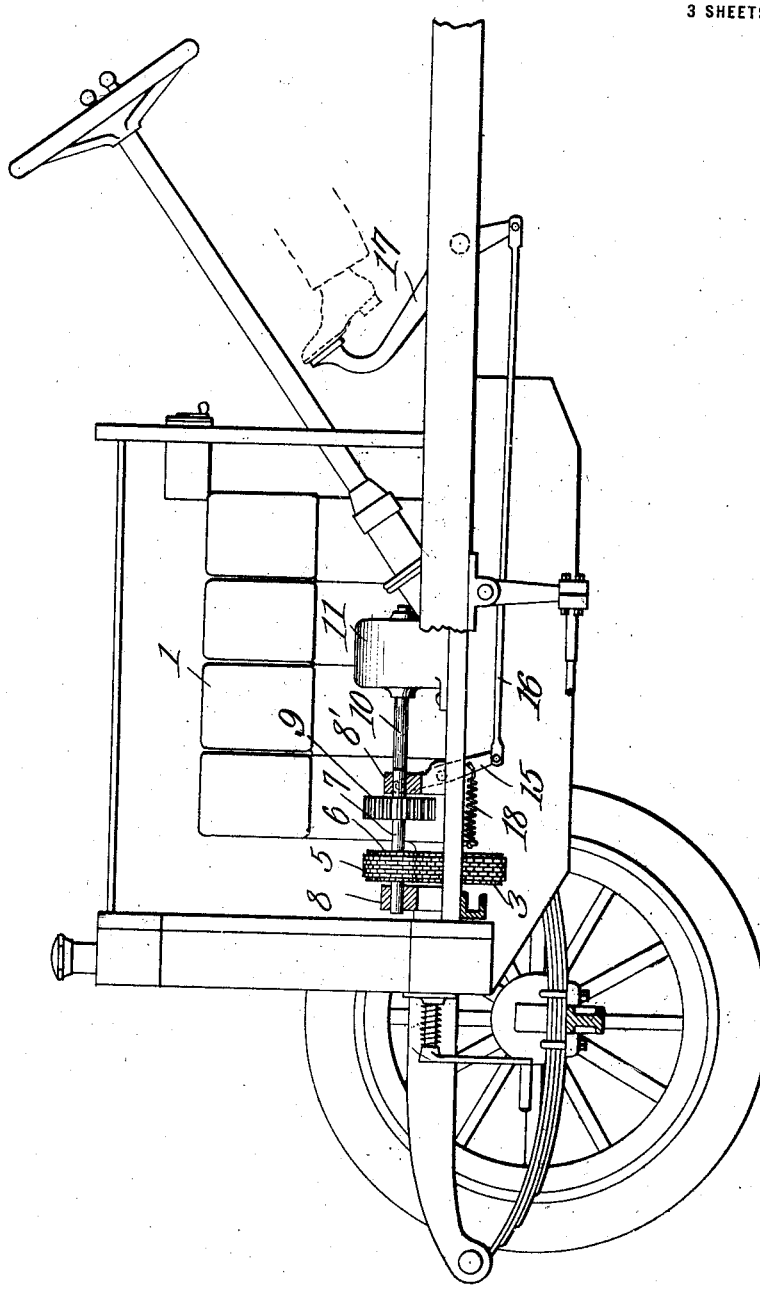

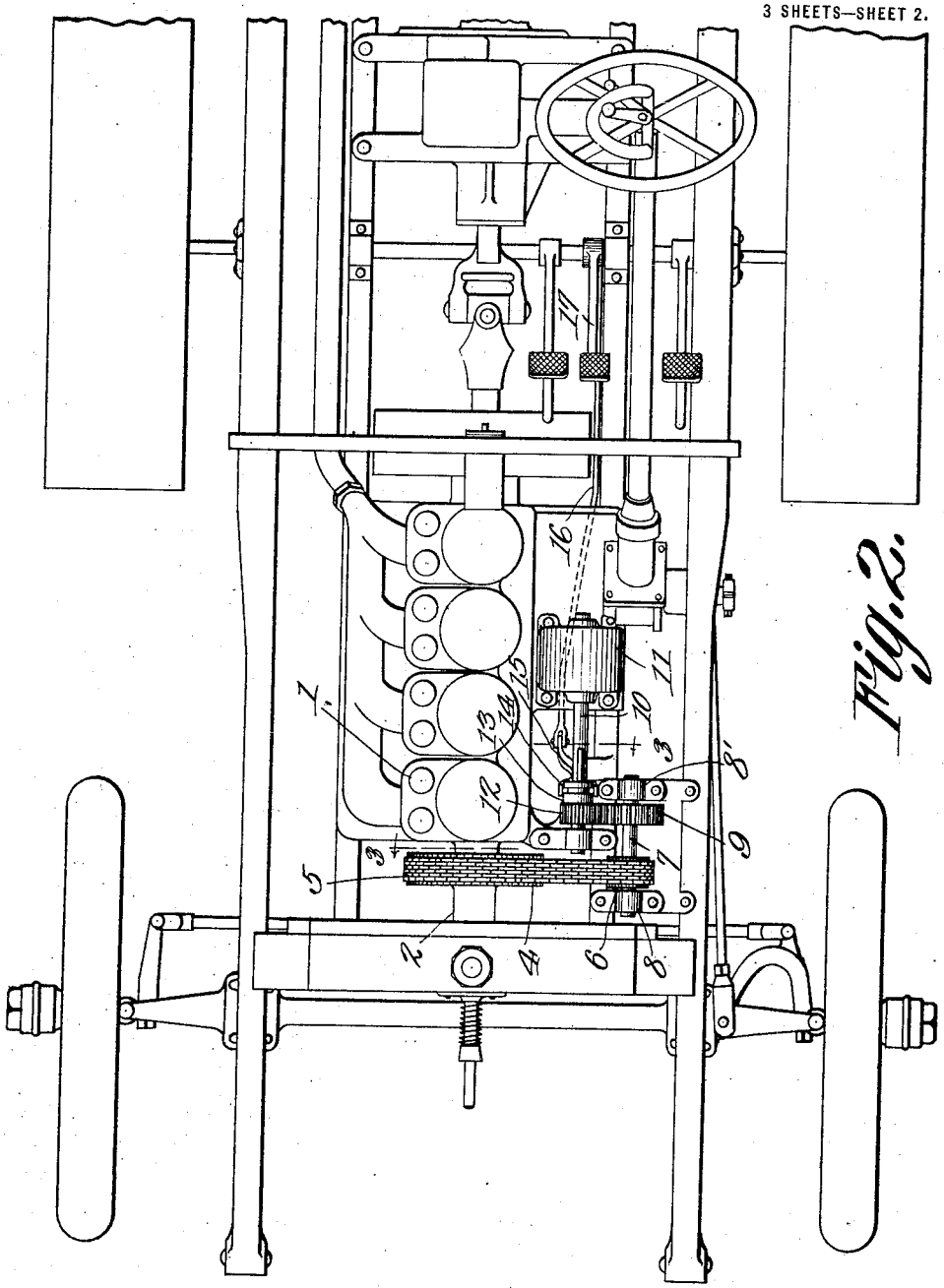

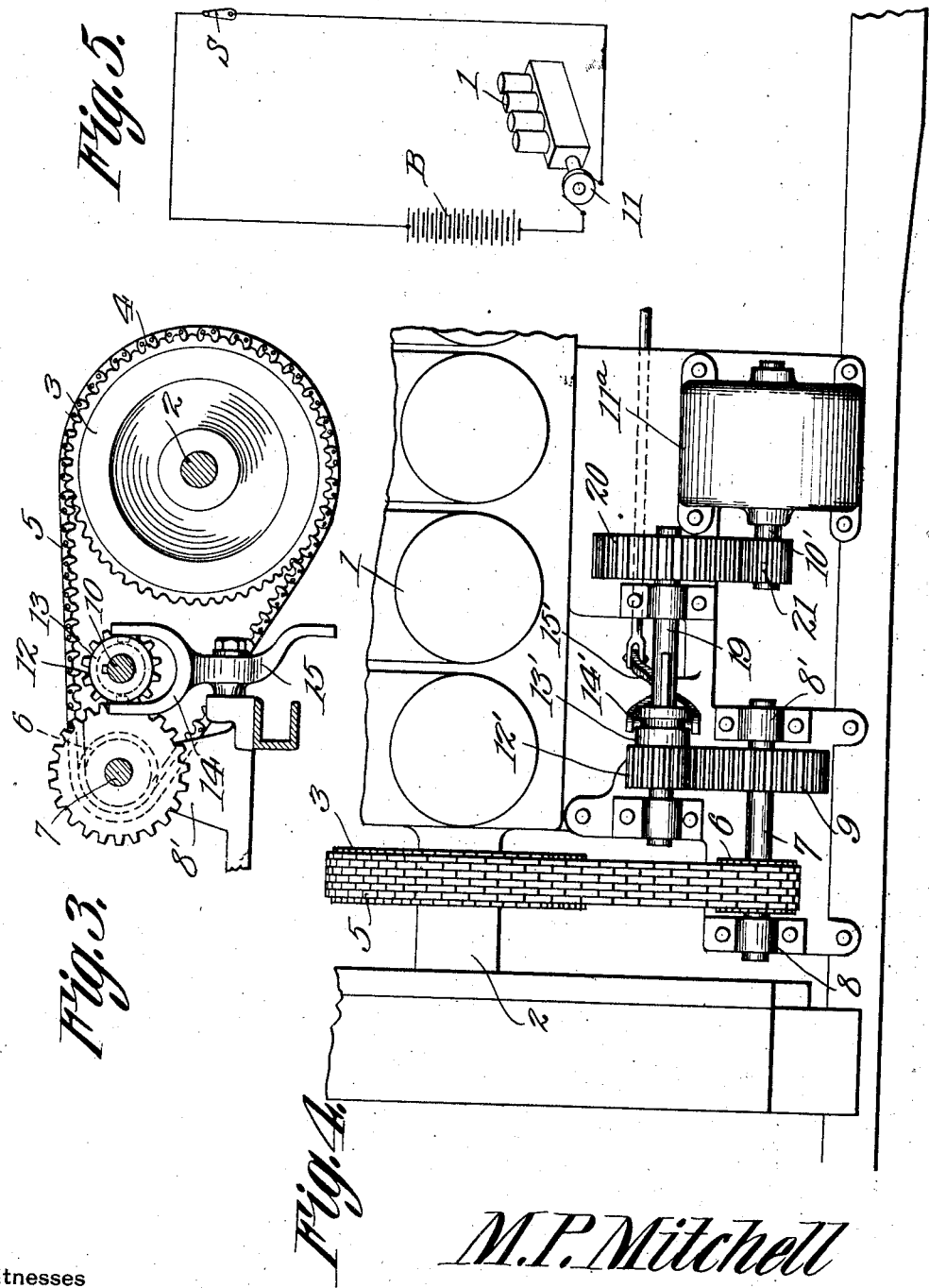

MARY PIERSON MITCHELL, OF EATON, OHIO.

ELECTRIC ENGINE-STARTER.

1,171,867.  Specification of Letters Patent.  Patented Feb. 15, 1916.

Application filed March 14, 1914. Serial No. 824,829.

*To all whom it may concern:*

Be it known that I, MARY P. MITCHELL, a citizen of the United States, residing at Eaton, in the county of Preble and State of Ohio, have invented a new and useful Electric Engine-Starter, of which the following is a specification.

The present invention relates to improvements in electric engine starters, one object of the invention, being the provision of a complete assemblage, by means of which the engine shaft may be rotated at the primary starting of the engine through the instrumentality of an electric motor and a selective mechanism controlled manually for connecting said motor to operate the engine shaft, thus providing a means whereby the chauffeur or operator seated within the motor car may operate the present invention to start the engine through the electric motor, without the necessity of manually cranking the same.

A further object of the present invention is the provision of a transmission mechanism operably connected to the crank shaft of an explosion engine, whereby an electric motor may be selected manually to crank the engine, there being connected to the crank shaft and the transmission mechanism a noiseless chain, whereby the friction of such actuation is reduced to a minimum, and the chain and gears run practically noiselessly both when the motor is under torque and is operating to crank the engine and when the engine shaft is operating explosively and running the noiseless chain and its sprocket freely.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation of the present invention as applied to a motor car explosive engine. Fig. 2 is a top plan view of the forward end of a motor car showing the present invention applied to the engine and crank shaft thereof. Fig. 3 is a section taken on line 3—3 of Fig. 2. Fig. 4 is an enlarged detailed top plan view showing a modified form of transmission. Fig. 5 is a diagrammatic view showing the electrical circuit for operating the motor.

Referring to the drawings, the numeral 1 designates the explosion engine, having the crank shaft 2. In this instance a disk 3 is keyed to the crank shaft and is provided with the teeth 4 for the reception of a plurality of noiseless sprocket chains 5, which constitute an exceedingly simple and satisfactory transmission, giving the proper wide bearing surface and at the same time, the desired gripping surface and producing no noise when operating either under stress when the shaft 2 is being cranked at the initial starting of the engine or the same is running freely due to the rotation of the crank shaft when the engine is operating explosively. A sprocket wheel 6 which is of smaller diameter than the sprocket wheel 3 is keyed upon a counter shaft 7, said shaft being journaled in the brackets 8—8', and disposed in parallel to the crank shaft 2. A pinion 9 is keyed upon the shaft 7 so that said shaft may be properly driven from the electric motor 11 provided with and carrying the shaft 10 which as shown in Figs. 1, 2 and 3 is disposed parallel to and between the crank shaft 2 and the counter shaft 7. A pinion 12 is splined for sliding movement upon the shaft 10 and through the grooved spool 13, which is integral therewith and the forked end 14 of the operating lever 15, the same is moved into and out of mesh with the gear 9, so that at the desired time, the electric motor 11 may be connected to operate the shaft 7 and consequently through the chain 5 to rotate and crank the engine.

In order to provide a means for operating the lever 15, a rod 16 is connected thereto and is extended rearwardly to and for connection with the foot lever 17 which is in ready access to the operator within the motor car. Thus by depressing the foot lever 17, the gear 12 is moved into mesh with the gear 9 and consequently should the switch S of the electrical circuit as illustrated in Fig. 5 be closed, the current flowing from the battery B will operate the motor 11 and consequently rotate the crank shaft so that the engine 1 will be started and permitted to act thereafter explosively. A spring 18 is connected to the lever 15, so as to automatically throw the gear 12 out of mesh with the gear 9 as soon as the foot lever 17 is released.

As shown in Fig. 4, a shaft 19 is interposed to permit of the reduction of speed to a greater degree from the motor 11ª to the crank shaft 2 than in the installation heretofore described. In this instance, the splined gear 12' is mounted upon the shaft 19, while the gear 20 which is keyed thereupon is in mesh at all times with the small gear 21 carried by the shaft 10' of the electric motor 11ª. The grooved spool 13' of the pinion 12' is operated by means of the fork 14' of the lever 15', said lever being operated by a foot lever as heretofore described so that the gear 12' may be placed in mesh with the gear 9 and thus properly connect the motor 11ª with the crank shaft 2.

What is claimed is:

A gearing comprising three parallel shafts, one being a driving shaft and being disposed between the other two, sprocket wheels upon said two shafts, a sprocket chain trained around said sprocket wheels, a gear secured upon one of said two shafts, one end of the first mentioned shaft terminating short of said sprocket chain and the other end thereof projecting beyond that shaft having the gear, a gear slidable upon the first mentioned shaft into and out of mesh with the aforesaid gear, and means for shifting the second mentioned gear.

In testimony that I claim the foregoing as my own, I have hereto affixed my signature in the presence of two witnesses.

MARY PIERSON MITCHELL.

Witnesses:
 JOHN RISINGER,
 HARRY L. RISINGER.